United States Patent
Krishna et al.

(10) Patent No.: US 11,858,235 B2
(45) Date of Patent: Jan. 2, 2024

(54) TRIM BREAKER HAVING METALLIC INSERT FOR DECREASED GAS PERMEATION

(71) Applicant: WHIRLPOOL CORPORATION, Benton Harbor, MI (US)

(72) Inventors: Sai B. Krishna, Pune (IN); Vishal S. Marathe, Pune (IN); Sushilkumar R. Vishwakarma, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 149 days.

(21) Appl. No.: 17/477,094

(22) Filed: Sep. 16, 2021

(65) Prior Publication Data

US 2023/0080063 A1 Mar. 16, 2023

(51) Int. Cl.
| | |
|---|---|
| *B32B 15/082* | (2006.01) |
| *B29C 45/00* | (2006.01) |
| *B29C 45/14* | (2006.01) |
| *B32B 15/09* | (2006.01) |
| *B32B 15/18* | (2006.01) |
| *D06F 39/12* | (2006.01) |
| *F24C 15/02* | (2006.01) |
| *F25D 23/06* | (2006.01) |
| *F25D 23/08* | (2006.01) |
| *B29K 27/06* | (2006.01) |
| *B29K 67/00* | (2006.01) |
| *B29K 509/08* | (2006.01) |
| *B29K 509/10* | (2006.01) |
| *B29K 705/12* | (2006.01) |

(52) U.S. Cl.
CPC ........ *B32B 15/082* (2013.01); *B29C 45/0013* (2013.01); *B29C 45/14778* (2013.01); *B32B 15/09* (2013.01); *B32B 15/18* (2013.01); *D06F 39/12* (2013.01); *F24C 15/021* (2013.01); *F25D 23/065* (2013.01); *F25D 23/085* (2013.01); *B29K 2027/06* (2013.01); *B29K 2067/003* (2013.01); *B29K 2509/08* (2013.01); *B29K 2509/10* (2013.01); *B29K 2705/12* (2013.01); *B29K 2995/0067* (2013.01); *B32B 2264/101* (2013.01); *B32B 2307/304* (2013.01); *B32B 2307/7242* (2013.01); *B32B 2509/10* (2013.01); *F25D 23/066* (2013.01); *F25D 2201/10* (2013.01)

(58) Field of Classification Search
CPC .............................. F25D 23/085; F25D 23/066
See application file for complete search history.

(56) References Cited

U.S. PATENT DOCUMENTS

| | | | |
|---|---|---|---|
| 2,259,185 A | * 10/1941 | Swedman | ............. F25D 23/085 220/592.07 |
| 2,715,976 A | 8/1955 | Whitmore | |
| (Continued) | | | |

*Primary Examiner* — Daniel J Rohrhoff
(74) *Attorney, Agent, or Firm* — Price Heneveld LLP

(57) ABSTRACT

A vacuum insulated structure includes a trim breaker having a wrapper channel and a liner channel that extend perimetrically about the trim breaker. An inner liner is attached to the trim breaker at the liner channel. An outer wrapper is attached to the trim breaker at the wrapper channel. A metallic plate is disposed within the trim breaker and extends from a first area proximate the liner channel to a second area proximate the wrapper channel. The metallic plate defines an internal barrier to gas permeation through the trim breaker.

20 Claims, 9 Drawing Sheets

(56) References Cited

U.S. PATENT DOCUMENTS

| | | | |
|---|---|---|---|
| 2,792,959 | A | 5/1957 | Diamond et al. |
| 3,167,821 | A * | 2/1965 | Clark .................... F25D 23/082 49/498.1 |
| 5,476,318 | A | 12/1995 | Yingst et al. |
| 6,485,122 | B2 | 11/2002 | Wolf et al. |
| 6,655,766 | B2 | 12/2003 | Hodges |
| 10,837,697 | B2 | 11/2020 | Amorim et al. |
| 11,168,934 | B2 | 11/2021 | Celik et al. |
| 11,340,008 | B1 * | 5/2022 | Hunter .................... F25D 21/04 |
| 11,346,596 | B2 | 5/2022 | Awachat et al. |
| 2002/0021062 | A1 * | 2/2002 | Hodges ................ F25D 23/085 312/401 |
| 2002/0041134 | A1 * | 4/2002 | Wolf .................... F25D 23/085 312/400 |
| 2009/0031659 | A1 | 2/2009 | Kalfon |
| 2019/0162465 | A1 | 5/2019 | Allard et al. |
| 2020/0132359 | A1 * | 4/2020 | Amorim .............. F25D 23/082 |
| 2021/0199368 | A1 | 7/2021 | Awachat et al. |
| 2021/0231361 | A1 * | 7/2021 | Celik .................... F25D 23/085 |
| 2022/0252333 | A1 * | 8/2022 | Awachat .............. F25D 23/082 |

* cited by examiner

TRIM BREAKER HAVING METALLIC INSERT FOR DECREASED GAS PERMEATION

FIELD OF THE DEVICE

The device is in the field of appliance cabinets, and more specifically, a trim breaker for an appliance cabinet that includes a metallic insert for diminishing gas permeation through the trim breaker.

SUMMARY OF THE DISCLOSURE

According to one aspect of the present disclosure, a vacuum insulated structure includes a trim breaker having a wrapper channel and a liner channel that extend perimetrically about the trim breaker. An inner liner is attached to the trim breaker at the liner channel. An outer wrapper is attached to the trim breaker at the wrapper channel. A metallic plate is disposed within the trim breaker and extends from a first area proximate the liner channel to a second area proximate the wrapper channel. The metallic plate defines an internal barrier to gas permeation through the trim breaker.

According to another aspect of the present disclosure, a trim breaker for a vacuum insulated structure includes a plastic body that defines a wrapper channel and a liner channel. A plurality of gas-blocking flakes are disposed throughout the plastic body. A metallic plate is disposed entirely within the trim breaker and extends from a first area proximate the liner channel to a second area proximate the wrapper channel.

According to yet another aspect of the present disclosure, a vacuum insulated structure includes a trim breaker having a wrapper channel and a liner channel. An inner liner is attached to the trim breaker at the liner channel. An outer wrapper is attached to the trim breaker at the wrapper channel. A metallic plate is insert injection molded within the trim breaker and extends from a first area proximate the liner channel to a second area proximate the wrapper channel. The metallic plate defines an internal barrier to gas permeation through the trim breaker.

These and other features, advantages, and objects of the present disclosure will be further understood and appreciated by those skilled in the art by reference to the following specification, claims, and appended drawings.

Figure 1:
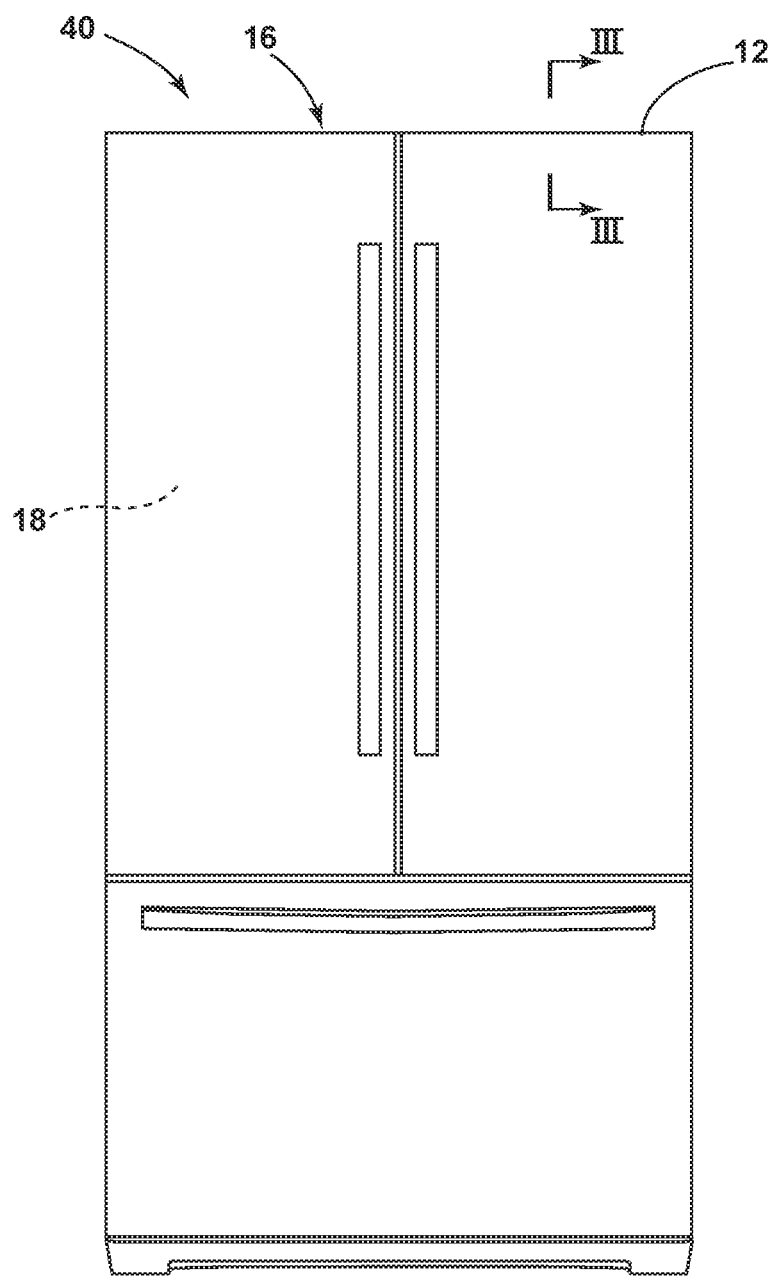
FIG. 1 is a front perspective view of a refrigerating appliance having a structural cabinet that incorporates an aspect of the trim breaker having the metal insert.
Figure 2:
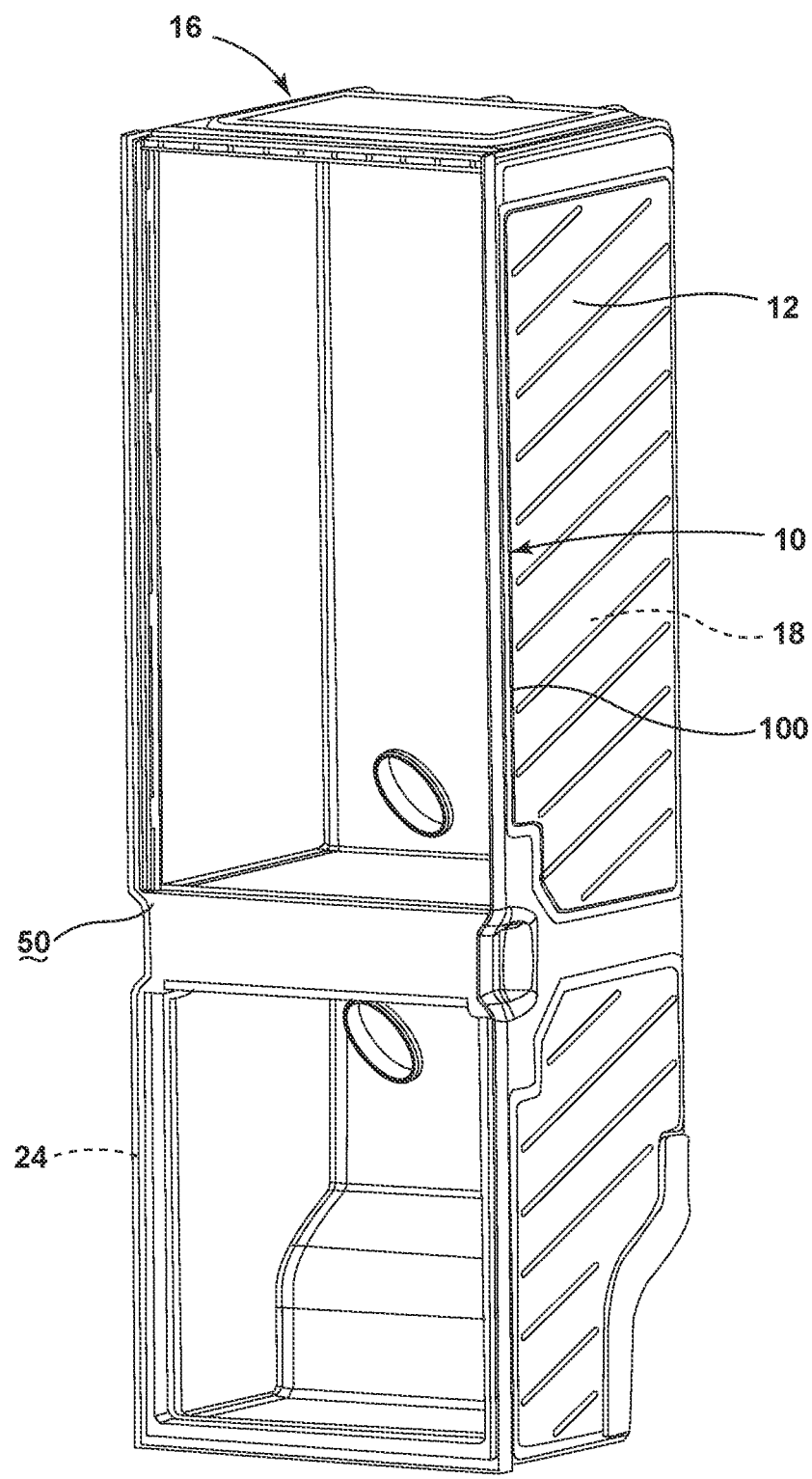
FIG. 2 is a front perspective view of a structural cabinet for an appliance that incorporates an aspect of the trim breaker having the metal insert.
Figure 3:
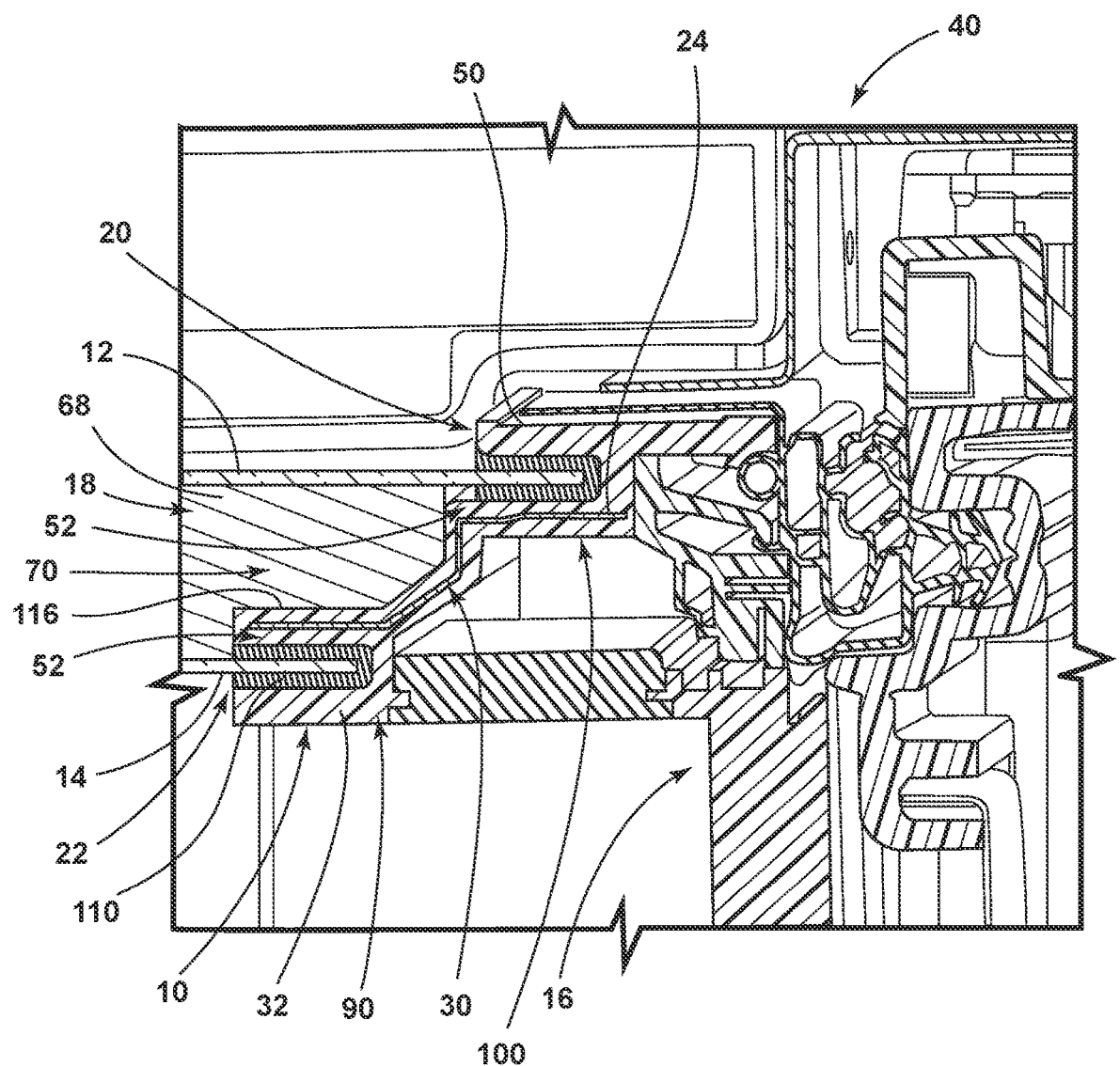
FIG. 3 is a cross-sectional view of the appliance of FIG. 1 taken along line III-III.

The components in the figures are not necessarily to scale, emphasis instead being placed upon illustrating the principles described herein.

DETAILED DESCRIPTION

The present illustrated embodiments reside primarily in combinations of method steps and apparatus components related to a trim breaker for an appliance cabinet having a metallic plate inserted therein. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

With respect to FIGS. 1-4, reference numeral 10 generally refers to a trim breaker that is incorporated within a structural cabinet 16 for an appliance 40. The trim breaker 10 extends between opposing metallic plates 24, typically in the form of an outer wrapper 12 and an inner liner 14, that cooperate to form the structural cabinet 16 having an insulating cavity 18 defined therein. According to various aspects of the device, the structural cabinet 16 can be in the form of a vacuum insulated structure that includes a trim breaker 10 having a wrapper channel 20 and a liner channel 22 that extend perimetrically about the trim breaker 10. The inner liner 14 is attached to the liner channel 22 of the trim breaker 10 and the outer wrapper 12 is attached to the trim breaker 10 at the wrapper channel 20. Through this configuration, the inner liner 14, the outer wrapper 12 and the trim breaker 10 cooperate to form the vacuum insulated structure. A metallic plate 24 is disposed within the trim breaker 10 and extends from a first area 26 proximate the liner channel 22 to a second area 28 proximate the wrapper channel 20. The metallic plate 24, through this configuration, defines an internal barrier 30 to gas permeation through the trim breaker 10.

Within structural cabinet 16, the inner liner 14 and the outer wrapper 12 can be made of a metallic material that is generally resistant to gas permeation therethrough. The trim breaker 10 that extends between the inner liner 14 and the outer wrapper 12 can be made of a plastic material 32. Plastic is generally a material that, by itself, allows gas to permeate therethrough. In the condition of a vacuum insulated structure, this gas permeation can, over time, allow gas to infiltrate into the insulating cavity 18 and degrade the at least partial vacuum 70 that is defined within the insulating cavity 18 of the structural cabinet 16. The inclusion of the metallic plate 24 within the trim breaker 10 reinforces the trim breaker 10 and also provides an additional internal barrier 30 to gas permeation that can limit the amount of gas that can permeate through the trim breaker 10 over time. The metallic plate 24 can also slow the rate of gas permeation by a significant amount. This configuration can extend the life of the at least partial vacuum 70 within the insulating cavity 18. In turn, this configuration can extend the life of an appliance 40 and the effectiveness and efficiency of the appliance 40 over its lifespan.

Referring again to FIGS. 1-4, it is contemplated that the trim breaker 10 includes a plastic material 32 that can be injection molded around the metallic plate 24. In this manner, the metallic plate 24 can be entirely encased within the plastic material 32 of the trim breaker 10 as a single unitary piece. In such an embodiment, no portion of the metallic plate 24 is visible from the outside surface 50 of the trim breaker 10. Using this configuration, the inner liner 14 and the outer wrapper 12 are prevented from having any direct physical connection with the metallic plate 24. By separating the metallic plate 24 from the inner liner 14 and the outer wrapper 12, thermal conductivity through the metal components of the structural cabinet 16 is prevented. At the same time, the metallic plate 24 and the metallic materials of the inner liner 14 and the outer wrapper 12 provide a substantially continuous barrier to gas permeation around the insulating cavity 18. The only gaps are defined by the spaces 52 between the metallic plate 24 and the inner liner 14 and the outer wrapper 12, respectively.

Figure 5:
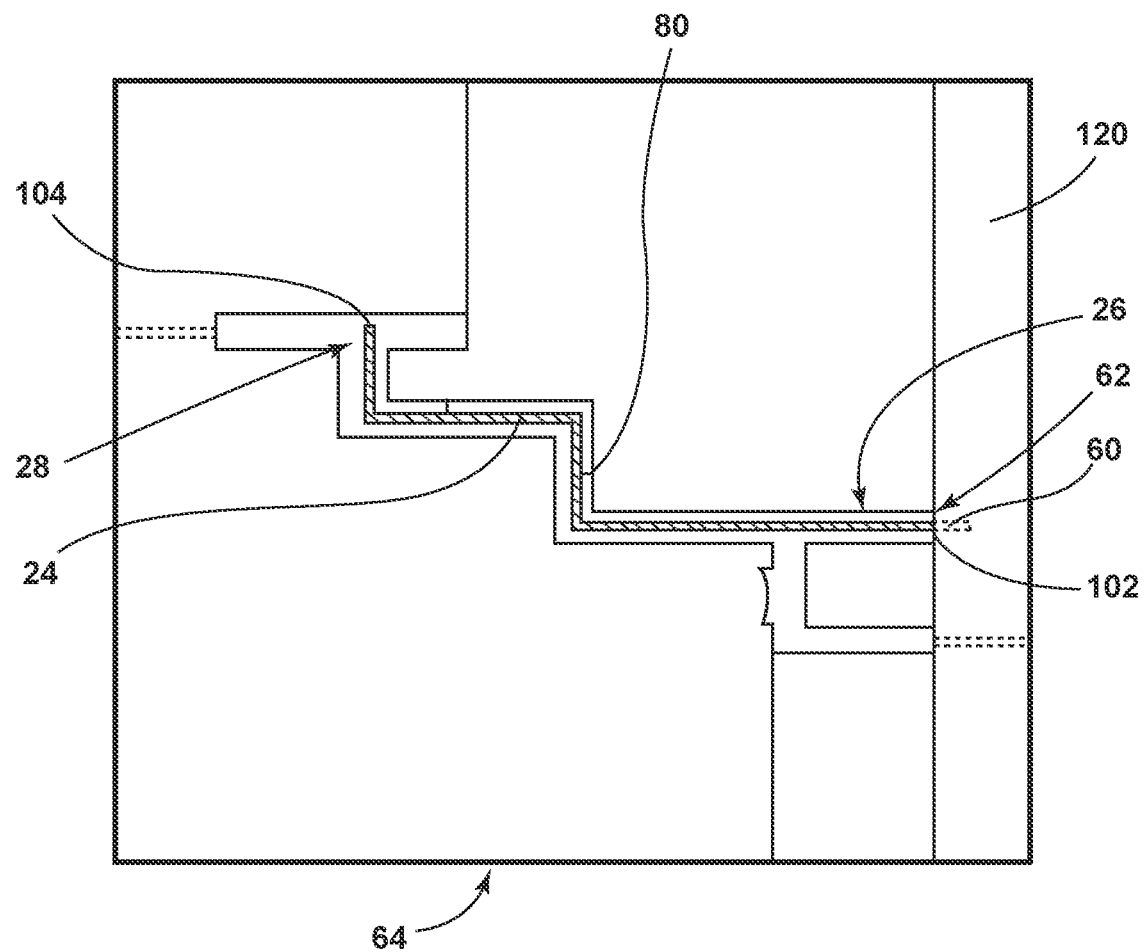
FIG. 5 is a schematic cross-sectional view of a mold used to form a trim breaker having a metal insert and showing placement of the metallic plate within the mold.
Figure 6:
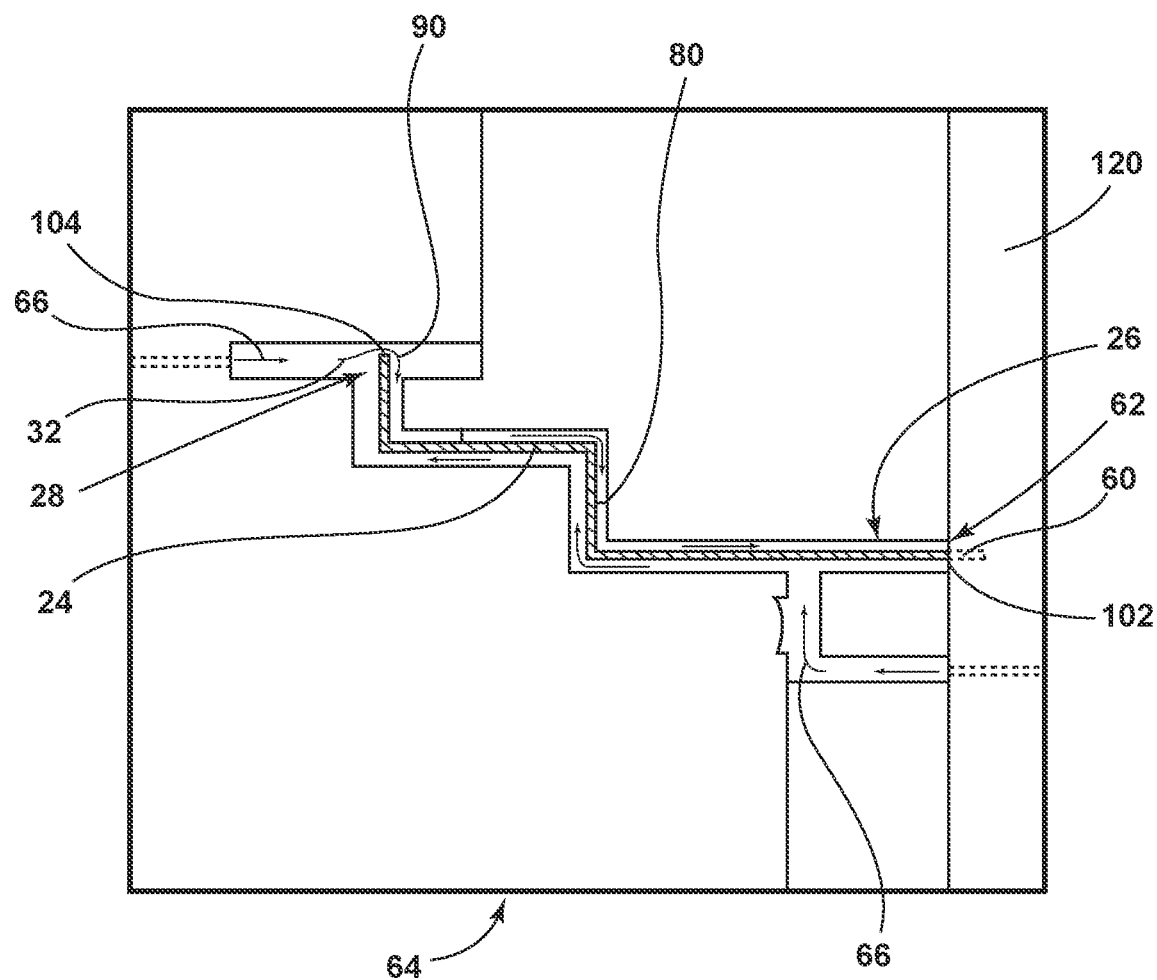
FIG. 6 is a cross-sectional view of the mold of FIG. 5 and showing movement of the injectable material within the mold.
Figure 7:
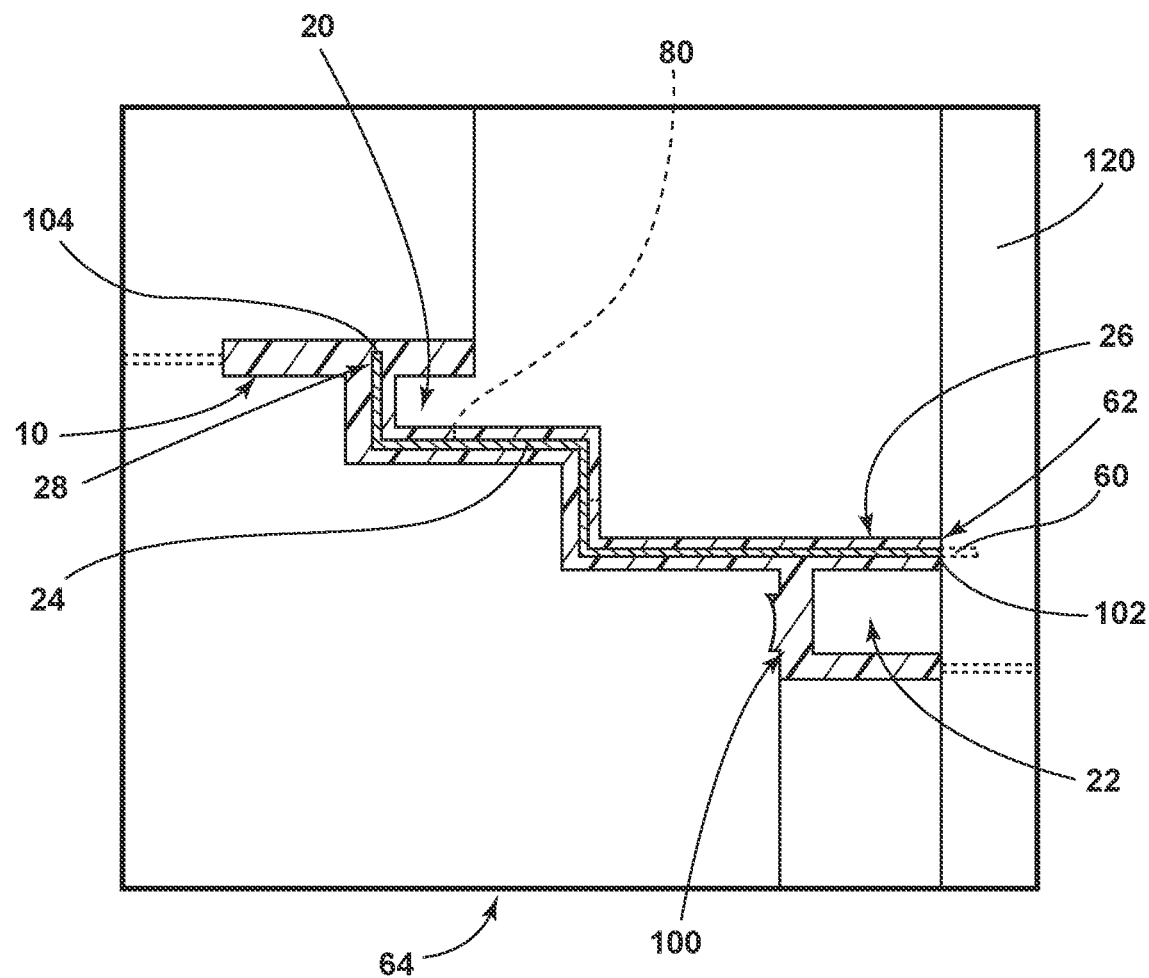
FIG. 7 is a cross-sectional view of the injection mold of FIG. 6 and showing the injectable material surrounding the metallic plate.

As exemplified in FIGS. 5-7, which illustrate a process for forming the trim breaker 10, a portion of the trim breaker 10 may be at least partially exposed within an outside surface 50 of the trim breaker 10. In such a configuration, an edge 60 of the metallic plate 24 may be co-planar with a plate-supporting portion 62 of the trim breaker 10. This plate-supporting portion 62 of the trim breaker 10 may be used to support the metallic plate 24 within a mold 64 so that injectable material 66 that is injected into the mold 64 and molded around the metallic plate 24 can be accurately positioned so that the injectable material 66 surrounds the remaining portions of the metallic plate 24 other than the edge 60 of the metallic plate 24. In order to prevent the edge 60 of the metallic plate 24 from providing a path for thermal conduction or a significant path for gas permeation, the edge 60 of the metallic plate 24 and the plate-supporting portion 62 of the trim breaker 10 can be positioned within a surface of the trim breaker 10 that faces into the insulating cavity 18 of the structural cabinet 16. Through this configuration, the edge 60 of the metallic plate 24 is positioned adjacent to an insulating material 68 and exposed to the at least partial vacuum 70 maintained within the insulating cavity 18.

Figure 8:
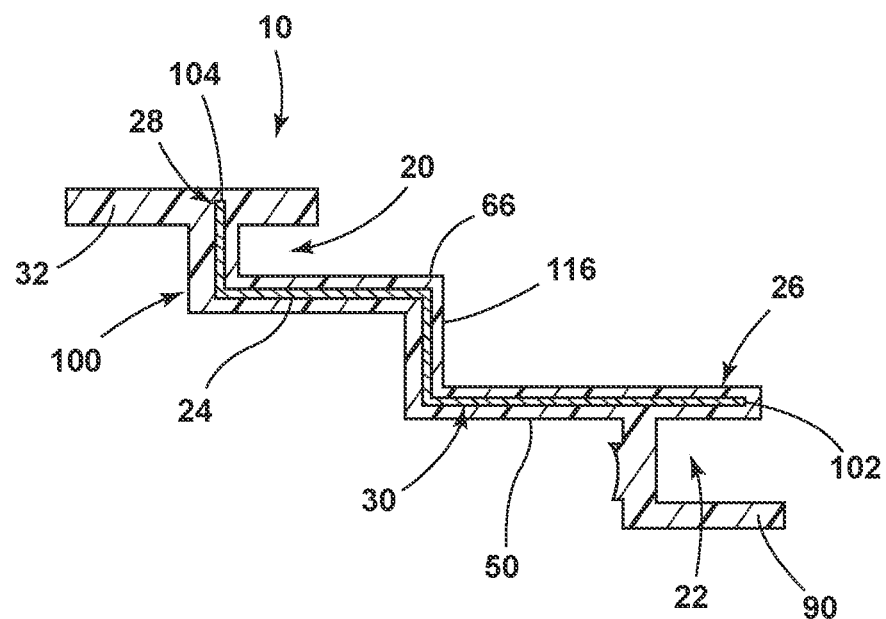
FIG. 8 is a cross-sectional view of an aspect of the trim breaker and showing a metallic plate completely embedded within the plastic material of the trim breaker.
Figure 9:
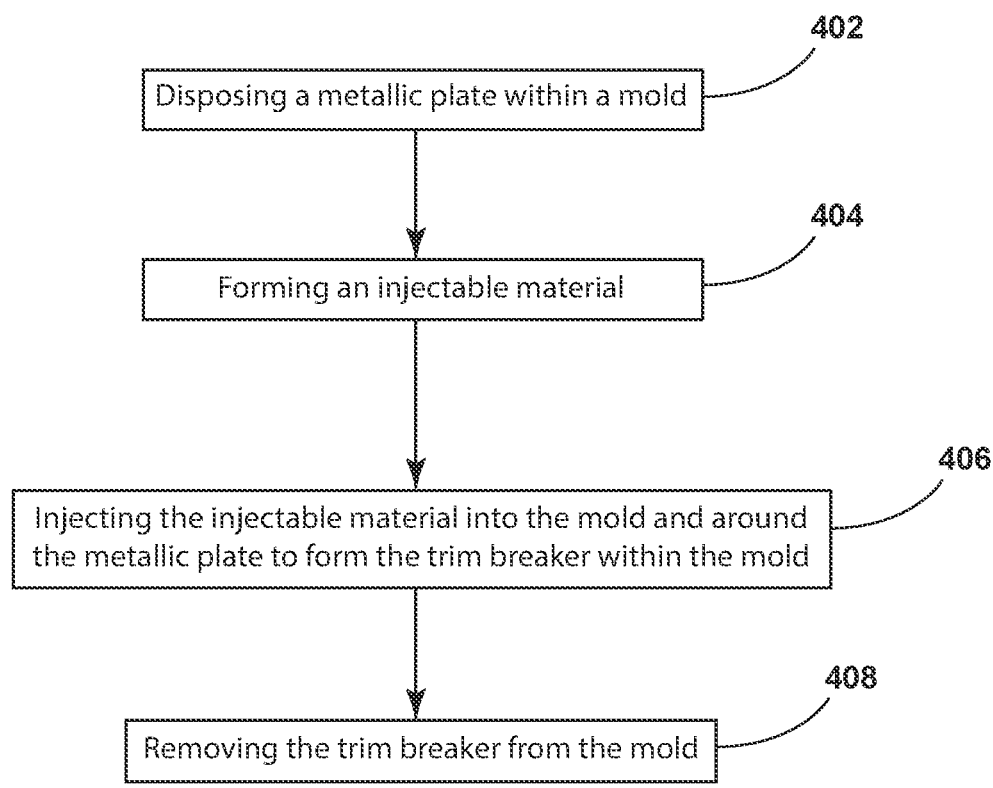
FIG. 9 is a schematic flow diagram illustrating a method for forming a trim breaker for a structural cabinet of an appliance.

As exemplified in FIG. 8, it is also contemplated that the entire metallic plate 24 can be embedded within the material of the trim breaker 10 so that the metallic plate 24 is completely surrounded by the injectable material 66 and is not exposed to areas outside of the trim breaker 10.

To achieve the positioning of the metallic plate 24 within the trim breaker 10, the metallic plate 24 can be insert injection molded within a mold 64. Through this process, the metallic plate 24 can be positioned within the mold 64 and can be positioned by one or more pins 80, that position the metallic plate 24 within the mold 64 so that the metallic plate 24 is supported in a consistent position as the injectable material 66 flows around the metallic plate 24 to form the structure of the trim breaker 10.

After the trim breaker 10 is removed from the mold 64, the voids left behind by the use of the pins 80 may be backfilled so that the entire metallic plate 24 is surrounded by the plastic material 32 of the trim breaker 10. As discussed above, the location of the pins 80 may also be oriented so that the voids within the plastic material 32 of the trim breaker 10 left behind by the use of the pins 80 are located within, or exposed to, the insulating cavity 18 for the structural cabinet 16. In either instance, it should be understood that the injectable material 66 of the trim breaker 10 is intended to surround, or substantially surround, the metallic plate 24. By using the phrase "substantially surround," it should be understood that certain portions of the trim breaker 10 may be exposed, such as the edge 60 of the metallic plate 24 or the location of the supporting pins 80 from the mold 64, which may provide for a minimal exposure of the metallic plate 24 to areas outside of the trim breaker 10.

Referring again to FIGS. 1-8, in addition to the metallic plate 24 providing a barrier to gas permeation, the injectable material 66 that surrounds the metallic plate 24 can also include materials that resist, or partially resist, gas permeation. In this manner, various aspects of the device can include gas-blocking flakes 90 that are incorporated within the injectable material 66 of the trim breaker 10. These gas-blocking flakes 90 can include mica, glass particles, or other similar naturally-occurring or manufactured particles that can be included within the injectable material 66 to assist in preventing gas permeation through the trim breaker 10. Where the gas-blocking flakes 90 are incorporated, the injectable material 66, typically a plastic material 32, is a substantially homogenous mixture of the plastic material 32 and the gas-blocking flakes 90. The substantial homogeneity of the injectable material 66 is achieved through the size of the gas-blocking flakes 90 being substantially microscopic, such that each particle of the gas-blocking flakes 90 has a dimension in the order of microns. The small size of these gas-blocking flakes 90 make them substantially imperceptible with a naked eye when mixed with an injectable material 66. Accordingly, the substantial homogeneity of the injectable material 66 can be achieved when the gas-blocking flakes 90 are incorporated within the plastic material 32 of the injectable material 66.

Referring again to FIGS. 3-8, the trim breaker 10 that can be used within vacuum insulated structures, such as the structural cabinet 16 described herein, can include a plastic body 100 that defines the wrapper channel 20 and the liner channel 22. A plurality of gas-blocking flakes 90 are disposed throughout the material of the plastic body 100. The metallic plate 24 is disposed entirely within the trim breaker 10 and extends from the first area 26 proximate the liner channel 22 to the second area 28 proximate the wrapper channel 20. The first and second areas 26, 28 between which the metallic plate 24 extends are areas within an interior of the trim breaker 10.

Figure 4:
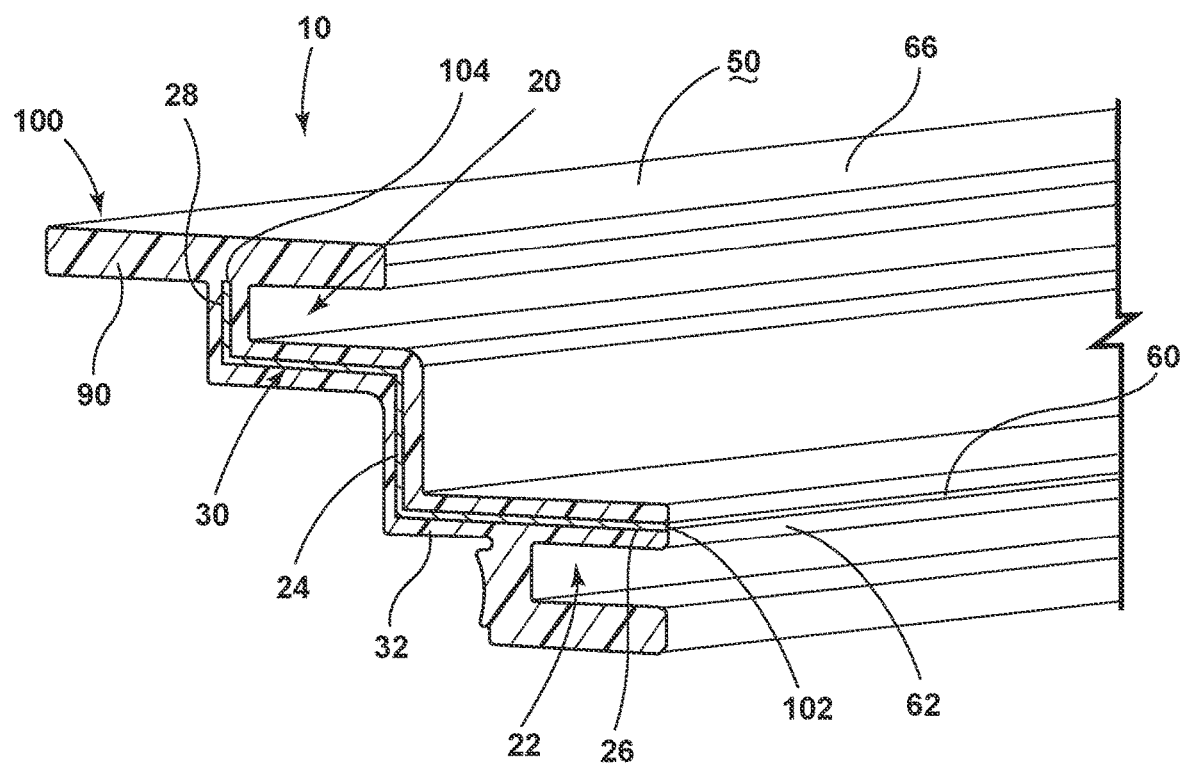
FIG. 4 is a cross-sectional view of the trim breaker having an aspect of the metal insert.

As exemplified in FIGS. 4, 7 and 8, the first area 26 proximate the liner channel 22 is within a portion of the trim breaker 10 that defines the liner channel 22. This first area 26, as with the metallic plate 24, is positioned entirely within the material of the trim breaker 10. Accordingly, the first edge 102 of the metallic plate 24 is located at this first area 26 proximate the liner channel 22 and is typically entirely encased within the trim breaker 10. As discussed above, in certain aspects of the device, the first edge 102, or a portion of the first edge 102 of the metallic plate 24, can be co-planar with the plate-supporting portion 62 of the trim breaker 10, such that the first edge 102 of the metallic plate 24, or a portion thereof, is exposed to the exterior of the trim breaker 10, but is located within the insulating cavity 18 for the structural cabinet 16. The second edge 104 of the trim breaker 10 is positioned within the second area 28 that is positioned proximate the wrapper channel 20. This second area 28 is configured to be located within an interior portion of the trim breaker 10 and within the injectable material 66. Through this configuration, the second edge 104 of the metallic plate 24 that is located at this second area 28 is also entirely encased within the material of the trim breaker 10.

In various aspects of the device, it is contemplated that the first edge 102 and/or the second edge 104 of the trim breaker 10 can wrap at least partially around the wrapper channel 20 and the liner channel 22, respectively. As exemplified in FIG. 7, the second edge 104 of the metallic plate 24 wraps partially around the wrapper channel 20. The location of the metallic plate 24 relative to the wrapper channel 20 and the liner channel 22 are configured to provide a substantially continuous barrier to gas permeation. Through this configuration, the metallic plate 24 is configured to cooperate with the metallic material of the inner liner 14 and the outer wrapper 12 to provide the substantially continuous barrier to gas permeation.

As exemplified in FIGS. 3-8, the wrapper channel 20 is configured to receive and secure the metallic outer wrapper 12, typically via an adhesive 110. The metallic plate 24 is separated from the metallic outer wrapper 12 at least by a portion of the plastic body 100 for the trim breaker 10. Similarly, the liner channel 22 receives and secures the metallic inner liner 14, typically via the adhesive 110. The metallic plate 24 is separated from the metallic inner liner 14 at least by a portion of the plastic body 100. As discussed above, the plastic body 100 includes the plastic material 32 and, in certain configurations, the gas-blocking flakes 90, that form the homogenous material, or substantially homogenous material, that is injection molded around the metallic plate 24 as a homogenous injectable material 66.

Referring again to FIGS. 1-8, the vacuum insulated structure can include the trim breaker 10 having the wrapper channel 20 and the liner channel 22. The inner liner 14 is attached to the trim breaker 10 at the liner channel 22 and the outer wrapper 12 is attached to the trim breaker 10 at the wrapper channel 20. The metallic plate 24 is insert injection-molded within the trim breaker 10 and extends from a first area 26 proximate the liner channel 22 to a second area 28 proximate the wrapper channel 20. As discussed above, the metallic plate 24 defines an internal barrier 30 to gas permeation through the trim breaker 10. Typically, the metallic plate 24 is made of steel, a steel alloy, or other similar metallic material that is resistive to gas permeation.

According to various aspects of the device, the plastic material 32 of the trim breaker 10 can include various plastic-type materials that can include any one of various plastic-type materials such as polymers, composite materials, and combinations thereof. Such exemplary plastic materials 32 can include, but are not limited to, polyvinyl chloride (PVC), polyethylene terephthalate (PET) that is at least partially glass-filled, various polyester materials, various co-polyester materials, and other similar polymers. Additionally, the outside surface 50 of the trim breaker 10 that is exposed to the insulating cavity 18 can be coated with various coating materials 116 that can include, but are not limited to, aluminum silicate (AL SiO2,) titanium coatings, and other similar coating materials 116. As discussed above, the gas-blocking flakes 90 can include mica, glass and other similar materials. These gas-blocking flakes 90 can be incorporated within the trim breaker 10 at various amounts. By way of example, and not limitation, the injectable material 66 for the trim breaker 10 can include a range of from approximately 5% to approximately 25% of the gas-blocking flakes 90, by volume. Other percentages of the gas-blocking flakes 90 can be incorporated depending upon the size of the particles of gas-blocking flakes 90, the weight of the gas-blocking flakes 90 and the individual characteristics that form the material of the gas-blocking flakes 90.

Referring now to FIGS. 1-9, having described various aspects of the trim breaker 10 that includes the metallic plate 24, a method 400 is disclosed for forming a trim breaker 10 having an aspect of the metallic plate 24. According to the method 400, a metallic plate 24 is disposed within the mold 64 (step 402). As discussed previously, the metallic plate 24 can be held in place through various pins 80 that are incorporated within the mold 64 or through the plate-supporting portion 62 for the trim breaker 10. According to the method 400, the injectable material 66 is formed (step 404). As discussed above, the injectable material 66 can include plastic and a plurality of gas-blocking flakes 90. After forming the injectable material 66, the injectable material 66 is injected into the mold 64 and around the metallic plate 24 (step 406). This injectable material 66 is then cooled and solidified around the metallic plate 24 to form a unitary assembly with the metallic plate 24 embedded therein. The trim breaker 10 can then be removed from the mold 64 (step 408). As discussed herein, the metallic plate 24 is encased, or substantially encased, within the trim breaker 10.

As exemplified in FIGS. 5-7, an aspect of the method 400 for forming the trim breaker 10 can include attaching the metallic plate 24 to a support section 120 that supports the metallic plate 24 relative to the mold 64. After the injectable material 66 is injected into the mold 64 and is solidified, the trim breaker 10 can be removed from the mold 64. Any excess portion of the metallic plate 24 that may extend from the trim breaker 10 can be removed through cutting, grinding, or other similar process for eliminating excess portions of the metallic plate 24 that may extend from the plate-supporting portion 62 of the trim breaker 10. As discussed above, any portion of the metallic plate 24 that is exposed to the outside of the trim breaker 10 can be positioned within the insulating cavity 18. Additionally, these exposed portions can be covered with at least a portion of the plastic material 32, coatings, and other gas-permeation resistive materials described herein.

According to various aspects of the device, the metallic plate 24 set within the trim breaker 10 is used to prevent gas permeation through the trim breaker 10 that might cause a degradation of an at least partial vacuum 70 within an insulating cavity 18. This barrier to gas permeation can also be used to maintain insulating gasses within the insulating cavity 18 and prevent leakage of these insulating gasses outside of the insulating cavity 18 of the structural cabinet 16. These insulating gasses can include, but are not limited to, carbon dioxide, various inert gasses, and other similar gasses that are typically used within insulating structures.

The trim breaker 10 having the metallic plate 24 incorporated therein can be used within various appliances 40. Such appliances 40 can include, but are not limited to, refrigerators, freezers, coolers, laundry appliances, ovens, water heaters, small appliances, and other similar appliances and fixtures that may require a pressure differential between the atmosphere and an interior insulating cavity 18.

According to another aspect of the present disclosure, a vacuum insulated structure includes a trim breaker having a wrapper channel and a liner channel that extend perimetrically about the trim breaker. An inner liner is attached to the trim breaker at the liner channel. An outer wrapper is attached to the trim breaker at the wrapper channel. A metallic plate is disposed within the trim breaker and extends from a first area proximate the liner channel to a second area proximate the wrapper channel. The metallic plate defines an internal barrier to gas permeation through the trim breaker.

According to another aspect, the trim breaker includes gas-blocking flakes that are incorporated throughout the trim breaker.

According to yet another aspect, the trim breaker includes a plastic material and the gas-blocking flakes as a homogenous material.

According to another aspect, the trim breaker is an injection molded piece, wherein the homogenous material is injection molded around the metallic plate.

According to yet another aspect, the metallic plate is entirely encased within the homogenous material of the trim breaker.

According to another aspect of the present disclosure, the metallic plate is separated from the inner liner and the outer wrapper at least by a plastic material of the trim breaker, wherein the plastic material substantially surrounds the metallic plate.

According to another aspect, an edge of the metallic plate is co-planar with a plate-supporting portion of the trim breaker, wherein the plate-supporting portion of the trim breaker is positioned within an insulating cavity defined between the inner liner, the outer wrapper and the trim breaker.

According to yet another aspect, the gas-blocking flakes are at least one of mica and glass.

According to another aspect of the present disclosure, the metallic plate is insert injection molded within the trim breaker.

According to another aspect, a trim breaker for a vacuum insulated structure includes a plastic body that defines a wrapper channel and a liner channel. A plurality of gas-blocking flakes are disposed throughout the plastic body. A metallic plate is disposed entirely within the trim breaker and extends from a first area proximate the liner channel to a second area proximate the wrapper channel.

According to yet another aspect, the wrapper channel receives a metallic wrapper that is secured within the wrapper channel, and wherein the metallic plate is separated from the metallic wrapper at least by a portion of the plastic body.

According to another aspect of the present disclosure, the liner channel receives a metallic liner that is secured within the liner channel, and wherein the metallic plate is separated from the metallic liner at least by a portion of the plastic body.

According to another aspect, the material of the plastic body and the gas-blocking flakes are injection molded around the metallic plate as a homogenous injectable material.

According to yet another aspect, the gas-blocking flakes are at least one of mica and glass.

According to another aspect of the present disclosure, a vacuum insulated structure includes a trim breaker having a wrapper channel and a liner channel. An inner liner is attached to the trim breaker at the liner channel. An outer wrapper is attached to the trim breaker at the wrapper channel. A metallic plate is insert injection molded within the trim breaker and extends from a first area proximate the liner channel to a second area proximate the wrapper channel. The metallic plate defines an internal barrier to gas permeation through the trim breaker.

According to another aspect, the trim breaker includes gas-blocking flakes that are incorporated within an injectable material of the trim breaker, wherein the injectable material is a substantially homogenous material.

According to yet another aspect, the metallic plate is entirely encased within the substantially homogenous material of the trim breaker.

According to another aspect of the present disclosure, an edge of the metallic plate is co-planar with a plate-supporting portion of the trim breaker. The plate-supporting portion of the trim breaker is positioned within an insulating cavity defined between the inner liner, the outer wrapper and the trim breaker.

According to another aspect, the gas-blocking flakes are at least one of mica and glass.

According to another aspect of the present disclosure, the metallic plate is steel.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vacuum insulated structure comprising:
   a trim breaker having a wrapper channel and a liner channel that extend perimetrically about the trim breaker;
   an inner liner attached to the trim breaker at the liner channel;
   an outer wrapper attached to the trim breaker at the wrapper channel; and
   a metallic plate disposed within the trim breaker and extending from a first area proximate the liner channel to a second area proximate the wrapper channel, the metallic plate defining an internal barrier to gas permeation through the trim breaker, wherein an edge of the metallic plate is co-planar with a plate-supporting portion of the trim breaker, wherein the plate-supporting portion of the trim breaker is positioned within an insulating cavity defined between the inner liner, the outer wrapper, and the trim breaker.

2. The vacuum insulated structure of claim 1, wherein the trim breaker includes gas-blocking flakes that are incorporated throughout the trim breaker.

3. The vacuum insulated structure of claim 2, wherein the trim breaker includes a plastic material and the gas-blocking flakes as a homogenous material.

4. The vacuum insulated structure of claim 3, wherein the trim breaker is an injection molded piece, wherein the homogenous material is injection molded around the metallic plate.

5. The vacuum insulated structure of claim 1, wherein the metallic plate is separated from the inner liner and the outer wrapper at least by a plastic material of the trim breaker, wherein the plastic material substantially surrounds the metallic plate.

6. The vacuum insulated structure of claim 2, wherein the gas-blocking flakes are at least one of mica and glass.

7. The vacuum insulated structure of claim 1, wherein the metallic plate is insert injection molded within the trim breaker.

8. A trim breaker for a vacuum insulated structure, the trim breaker comprising:
   a plastic body that defines a wrapper channel configured to receive a metallic outer wrapper and a liner channel configured to receive a metallic inner liner;
   a plurality of gas-blocking flakes that are disposed throughout the plastic body; and
   a metallic plate that is disposed entirely within the trim breaker and extends from a first area proximate the liner channel to a second area proximate the wrapper channel to define an internal barrier to gas permeation through the trim breaker, wherein an edge of the metallic plate is co-planar with a plate-supporting portion of the trim breaker, wherein the plate-supporting portion of the trim breaker is positioned between the wrapper channel and the liner channel, the plate-supporting portion of the trim breaker configured to be located within an insulating cavity defined between the metallic inner liner, the metallic outer wrapper, and the trim breaker.

9. The trim breaker of claim 8, wherein the wrapper channel receives a metallic wrapper that is secured within the wrapper channel, and wherein the metallic plate is separated from the metallic wrapper at least by a portion of the plastic body.

10. The trim breaker of claim 8, wherein a material of the plastic body and the plurality of gas-blocking flakes are injection molded around the metallic plate as a homogenous injectable material.

11. The trim breaker of claim 10, wherein the homogenous injectable material of the trim breaker includes a range of from approximately 5% to approximately 25% of the gas-blocking flakes, by volume.

12. The trim breaker of claim 8, wherein the plurality of gas-blocking flakes are at least one of mica and glass.

13. The trim breaker of claim 8, wherein the metallic plate is steel.

14. The trim breaker of claim 8, wherein the gas-blocking flakes are mica particles.

15. The trim breaker of claim 8, wherein a portion of an outer surface of the trim breaker includes an outer coating.

16. The trim breaker of claim 15, wherein the outer coating includes aluminum silicate.

17. A vacuum insulated structure comprising:
    a trim breaker having a wrapper channel and a liner channel;
    an inner liner attached to the trim breaker at the liner channel;
    an outer wrapper attached to the trim breaker at the wrapper channel; and
    a metallic plate that is insert injection molded within the trim breaker and extends from a first area proximate the liner channel to a second area proximate the wrapper channel, the metallic plate defining an internal barrier to gas permeation through the trim breaker, wherein the trim breaker includes gas-blocking flakes that are incorporated within an injectable material of the trim breaker, wherein the injectable material is a substantially homogenous material, and wherein the metallic plate is entirely encased within the substantially homogenous material of the trim breaker.

18. The vacuum insulated structure of claim 17, wherein the gas-blocking flakes are at least one of mica and glass.

19. The vacuum insulated structure of claim 17, wherein the metallic plate is steel.

20. The vacuum insulated structure of claim 17, wherein the trim breaker is an injection molded piece, wherein the substantially homogenous material is injection molded around the metallic plate.

* * * * *